(12) United States Patent  
Karlsson et al.

(10) Patent No.: US 7,258,051 B2
(45) Date of Patent: Aug. 21, 2007

(54) ARRANGEMENT FOR CUTTING AN OPTICAL FIBRE

(75) Inventors: Petter Karlsson, Rattvik (SE); Roland West, Järfalla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 467 days.

(21) Appl. No.: 09/986,544

(22) Filed: Nov. 9, 2001

(65) Prior Publication Data

US 2002/0056351 A1 May 16, 2002

(30) Foreign Application Priority Data

Nov. 10, 2000 (SE) .................................... 0004116

(51) Int. Cl.
*B26D 5/00* (2006.01)
(52) U.S. Cl. ................................. 83/62; 83/63; 83/913
(58) Field of Classification Search ................ 83/62, 83/62.1, 63, 66, 913, 907
See application file for complete search history.

(56) References Cited

U.S. PATENT DOCUMENTS

| | | | | |
|---|---|---|---|---|
| 3,880,028 | A * | 4/1975 | Frederick, Jr. ............... 83/880 |
| 4,035,790 | A * | 7/1977 | Farmer ....................... 340/679 |
| 4,048,884 | A * | 9/1977 | Winn, Jr. ...................... 83/24 |
| 4,084,308 | A * | 4/1978 | Runge ........................ 29/527.2 |
| 4,088,899 | A * | 5/1978 | Miller et al. ................... 83/13 |
| 4,343,069 | A * | 8/1982 | McLuskie et al. ............. 83/913 |
| 4,644,647 | A * | 2/1987 | Szostak et al. ................ 83/879 |
| 4,655,111 | A * | 4/1987 | Blaker et al. ................. 83/913 |
| 5,115,403 | A * | 5/1992 | Yoneda et al. .................. 83/72 |
| 5,299,478 | A * | 4/1994 | Schorn et al. .................. 83/74 |
| 5,382,276 | A * | 1/1995 | Hakoun et al. ............... 65/433 |
| 5,515,758 | A * | 5/1996 | Bechmann .................... 83/880 |
| 5,832,801 | A * | 11/1998 | Bando ......................... 83/483 |
| 5,842,622 | A * | 12/1998 | Mansfield et al. ......... 225/96.5 |
| 5,888,268 | A * | 3/1999 | Bando ......................... 65/286 |
| 5,905,440 | A * | 5/1999 | Julian et al. ................. 340/680 |
| 5,970,831 | A * | 10/1999 | Mattinger et al. .............. 83/13 |
| 6,412,677 | B1 * | 7/2002 | Yoshikuni et al. ............. 225/2 |
| 6,430,787 | B1 * | 8/2002 | Becan et al. ................. 83/940 |
| 6,505,388 | B1 * | 1/2003 | Becan et al. ................... 26/16 |
| 6,508,152 | B1 * | 1/2003 | Kern et al. .................... 83/907 |
| 6,598,774 | B2 * | 7/2003 | Kazama et al. ............... 83/167 |
| 7,070,078 | B2 * | 7/2006 | Song ........................... 83/375 |

FOREIGN PATENT DOCUMENTS

| | | | | |
|---|---|---|---|---|
| JP | 54113583 | A | * | 9/1979 |
| JP | 6148456 | A | | 8/1994 |
| JP | 8334627 | A | | 4/1997 |

* cited by examiner

*Primary Examiner*—Timothy V. Eley
*Assistant Examiner*—Jason Prone
(74) *Attorney, Agent, or Firm*—Buchanan Ingersoll & Rooney PC

(57) ABSTRACT

An arrangement for cutting an optical fibre comprises a fibre cutter for cutting the fibre. A motor is provided to operate the cutter. To start a cutting movement, the motor is controlled by a control unit in response to a start signal. The start signal is generated when the fibre is located in the cutter. A detector is connected to the control unit to detect when the fibre snaps off and in response thereto cause the control unit to generate a stop signal to stop the cutting movement. If no fibre snap off is detected, the cutting movement is automatically stopped at a predetermined position of the cutter.

4 Claims, 1 Drawing Sheet

ARRANGEMENT FOR CUTTING AN OPTICAL FIBRE

TECHNICAL FIELD

The invention relates generally to optical fibres and more specifically to an arrangement for cutting such fibres.

BACKGROUND OF THE INVENTION

Today, optical fibres are cut by means of hand-operated fibre cutters. Such cutters comprise a fixture for receiving a fibre as well as mechanical means for tensioning, bending and nicking the fibre.

With such a hand-operated cutter, it is impossible for an operator to ensure successive identical cuts. Also, it will be necessary to frequently readjust the cutter due to the rough treatment of the cutter by the operator.

SUMMARY OF THE INVENTION

The object of the invention is to bring about an arrangement for automated cutting of optical fibres to secure successive identical cuts.

This is attained by the arrangement according to the invention in that a motor is provided to operate the cutter. The motor is controlled to start a cutting movement in response to a start signal from a control unit. The start signal is generated when the fibre is located in the cutter. A detector is connected to the control unit to detect snap off of the fibre and in response hereto cause the control unit to generate a stop signal to stop the cutting movement. The cutting movement is automatically stopped at a predetermined position if no fibre snap off is detected.

By running the motor repeatedly at the same speed, the same cutting force will be applied to successive fibres. Hereby, identical cuts will be secured.

BRIEF DESCRIPTION OF THE DRAWING

The invention will be described more in detail below with reference to the appended drawing on which

DESCRIPTION OF THE INVENTION

Figure 1:
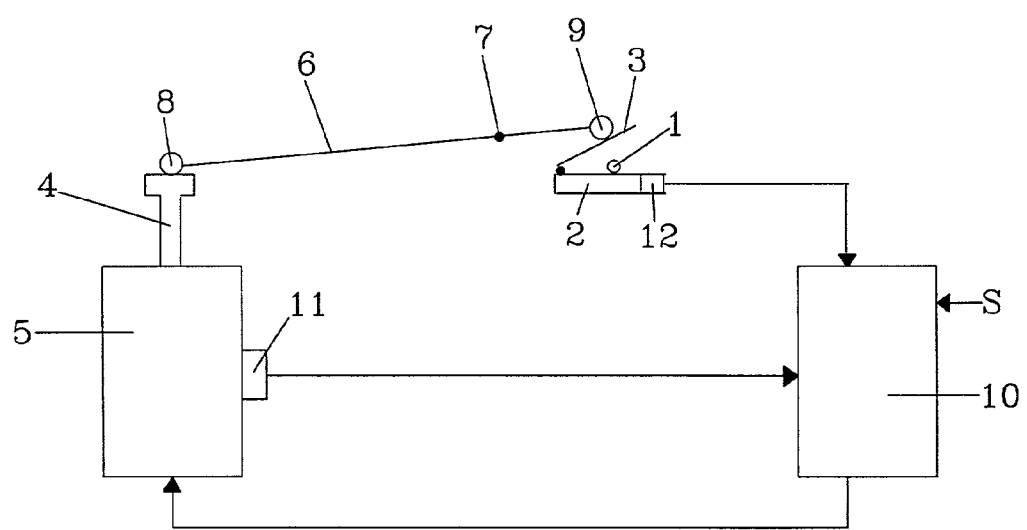
FIG. 1 is a schematic block diagram of an embodiment of an arrangement according to the invention.

FIG. 1 is a schematic block diagram of an embodiment of an arrangement according to the invention for cutting an optical fibre 1.

The fibre 1 is received in a fibre cutter, e.g. a known hand-operated cutter. In a manner known per se, the cutter comprises a fixture 2 and a handle 3 pivoted to the fixture 2 for pressing the fibre 1 towards mechanical tensioning, bending and nicking means (not shown) in the fixture 2 in order to cut the fibre 1. The fibre 1 can be placed in the fixture 2 by means of e.g. a robot arm (not shown).

In accordance with the invention, the handle 3 of the cutter is operated by a motor and not by hand.

In the embodiment shown in FIG. 1, the handle 3 is operated by a shaft 4 of a linear motor 5 via a lever 6 that is pivoted around a spindle 7. The ends of the lever 6 are provided with rollers such that a roller 8 is in contact with the end of the shaft 4 of the linear motor 5, and a roller 9 is in contact with the top side of the handle 3 of the cutter.

Thus, when the linear motor 5 runs and the shaft 4 of the linear motor 5 rises, the handle 3 is pressed down towards the fibre 1 via the roller 9.

The operation of the linear motor 5 is controlled by an output signal from a control unit 10. The control unit 10 is adapted to initiate a cutting movement in response to a start signal S from an operator or a robot when the fibre 1 to be cut has been placed in the fixture 2.

A sensor 11 is provided to continuously sense the position of the shaft 4 of the linear motor 5. The sensor 11 is connected to the control unit 10 to transfer information about the position of the shaft 4 to the control unit 10.

To control the operation of the linear motor 5 and thereby indirectly the operation of the handle 3 in accordance with the invention, a detector 12 is provided to detect when the fibre 1 snaps off when cut. Preferably, the detector 12 is located on the fixture 2.

In a preferred embodiment, the detector 12 is an acoustic detector, e.g. a microphone that is adapted to detect a snap off sound when the fibre 1 snaps off.

The detector 12 can comprise an amplifier and a band-pass filter (not shown) and is adapted to generate an output signal only upon a snap off sound relating to the snap off of the fibre 1.

The detector 12 is connected to the control unit 10 that in response to the output signal of the detector 12 is adapted to immediately stop the linear motor 5 to stop the cutting movement of the handle 3.

If no snap off sound is detected by the detector 12 in connection with a cutting movement, the sensor 11 on the motor 5 is adapted to generate an output signal to the control unit 10 at a predetermined position of the shaft 4. In response to this output signal, the control unit 10 is adapted to immediately stop the motor 5.

As should be apparent from the above, successive identical cuts can be made with the arrangement according to the invention.

What is claimed is:

1. An arrangement for cutting an optical fiber, comprising:
a fiber cutter having a handle pivoted to the fiber cutter to cut fiber;
a pivoting lever having a roller at one end in contact with the handle;
a motor provided with a shaft capable of rising against another end of the pivoting lever to operate the fiber cutter by pressing on the roller, effectuating a cutting movement of the pivoted handle;
a control unit, the motor being controlled by the control unit to start the cutting movement in response to a start signal to be generated when the fiber is located in the fiber cutter; and
a detector connected to the control unit to detect snap off of the fiber and in response thereto cause the control unit to generate a stop signal to stop the cutting movement.

2. The arrangement according to claim 1, wherein the motor is a linear motor.

3. The arrangement according to claim 1, wherein the detector is an acoustic detector adapted to detect a snap sound when the fiber snaps off.

4. The arrangement according to claim 3, wherein the detector is a microphone.

* * * * *